United States Patent
Kane (10) Patent No.: US 11,178,108 B2
(45) Date of Patent: Nov. 16, 2021

(54) FILTERING FOR NETWORK TRAFFIC TO BLOCK DENIAL OF SERVICE ATTACKS

(71) Applicant: QIP SOLUTIONS LIMITED, Bournemouth (GB)

(72) Inventor: Fiona Kane, Bournemouth (GB)

(73) Assignee: QIP SOLUTIONS LIMITED, Bournemouth (GB)

( * ) Notice: Subject to any disclaimer, the term of this patent is extended or adjusted under 35 U.S.C. 154(b) by 0 days.

(21) Appl. No.: 16/952,014

(22) Filed: Nov. 18, 2020

(65) Prior Publication Data
US 2021/0075766 A1 Mar. 11, 2021

Related U.S. Application Data

(63) Continuation of application No. PCT/EP2019/062896, filed on May 17, 2019.

(30) Foreign Application Priority Data

May 18, 2018 (GB) ...................................... 1808107

(51) Int. Cl.
*H04L 29/06* (2006.01)

(52) U.S. Cl.
CPC ........ *H04L 63/0236* (2013.01); *H04L 63/045* (2013.01); *H04L 63/1458* (2013.01); *H04L 63/166* (2013.01)

(58) Field of Classification Search
CPC ............... H04L 63/0236; H04L 63/045; H04L 63/1458; H04L 63/166; H04L 29/06; G06F 21/55
See application file for complete search history.

(56) References Cited

U.S. PATENT DOCUMENTS

| 7,069,434 B1* | 6/2006 | Ilnicki .................. H04L 9/0825 380/259 |
| 8,856,869 B1* | 10/2014 | Brinskelle ........... G06F 21/6218 726/2 |
| 9,043,893 B1* | 5/2015 | Benson ............... H04L 63/0236 726/11 |
| 9,300,629 B1* | 3/2016 | Jahr ........................ H04L 67/02 |
| 2003/0009571 A1* | 1/2003 | Bavadekar .............. H04L 47/18 709/230 |
| 2006/0021004 A1 | 1/2006 | Moran et al. |
| 2008/0077983 A1* | 3/2008 | Meyer ................... H04L 63/083 726/12 |

(Continued)

FOREIGN PATENT DOCUMENTS

GB 2563497 B 12/2018

OTHER PUBLICATIONS

International Search Report in PCT/EP2019/062896 dated Jun. 12, 2019, 3 pages.

(Continued)

*Primary Examiner* — Techane Gergiso (57) ABSTRACT

The invention comprises a method for filtering data. The method comprises receiving a network request from a client, determining, based on one or more filtering criteria, whether to forward the network request to a server, and based on the determining, forwarding the network request to the server, or preventing the network request from reaching the server and blocking future network requests from the client.

18 Claims, 7 Drawing Sheets

(56) References Cited

U.S. PATENT DOCUMENTS

| | | | |
|---|---|---|---|
| 2009/0199285 A1* | 8/2009 | Agarwal | H04L 67/02 726/9 |
| 2012/0233464 A1* | 9/2012 | Miller | G09B 5/06 713/168 |
| 2014/0337614 A1* | 11/2014 | Kelson | H04L 63/20 713/152 |
| 2016/0381061 A1* | 12/2016 | Vanunu | H04L 63/1433 726/25 |
| 2017/0070531 A1 | 3/2017 | Huston, III et al. | |
| 2017/0244737 A1* | 8/2017 | Kuperman | G06N 3/04 |

OTHER PUBLICATIONS

Information on Search Strategy in PCT/EP2019/062896, 1 page.
Written Opinion in PCT/EP2019/062896, dated Nov. 21, 2019, 10 pages.

* cited by examiner

FILTERING FOR NETWORK TRAFFIC TO BLOCK DENIAL OF SERVICE ATTACKS

CROSS-REFERENCE TO RELATED APPLICATIONS

This application is a continuation of International Application No. PCT/EP2019/062896, filed May 17, 2019, which claims the benefit of GB Application No. 1808107.5, filed May 18, 2018, the contents of both of which are hereby incorporated in their entireties.

BACKGROUND

A denial-of-service attack (DoS attack) is a highly disruptive form of cyber-attack carried out over a network in which the perpetrator seeks to make a network resource unavailable to its intended users by temporarily or indefinitely disrupting services of a host service connected to the network. In recent years there has been substantial increases in the number of Distributed Denial of Service (DDoS) attacks across the world. The sophistication of these attacks is increasing in terms coverage, bandwidth, attack vector variety, and number of malicious connection requests. Content providers have to be aware of the risks and take appropriate actions in light of the increasing sophistication of these attacks.

SUMMARY OF INVENTION

According to a first aspect of the present invention there is provided a method for filtering a data stream as provided in claim 1.

In some embodiments the method comprises: providing the server with a network address associated to the client.

In some embodiments the server communicates the response to the network request to the client based on the network address associated to the client.

In some embodiments the network request is a request to establish an end-to-end encryption channel with the server In some embodiments the method comprises establishing an end-to-end encryption channel from the server to the client in response to receiving the network request at the server.

In some embodiments the end-to-end encryption channel is secured with socket layer (SSL) and/or transport layer security (TLS) protocols.

In some embodiments secure Hypertext Transfer Protocol Secure (HTTPS) or Socket Secure (SOCKS) is used.

In some embodiments the filtering criteria comprise verification of CAPTCHA puzzles and metrics used to identify automated and/or non-human network traffic.

In some embodiments the filtering criteria comprise of initial verification by Authentication Server and metrics used to identify automated and/or non-human network traffic.

In some embodiment the method comprises determining the server from a plurality of servers to forward the network request to, based on performance metrics associated to the plurality of servers.

In some embodiments authenticating the client; and preventing the network request from reaching the server in response to a failed authentication.

In some embodiments the network request is a request to access a domain name associated to the server.

In some embodiments the network request is a request to access a domain name or IP address associated to the server, and wherein, based on the determining, the client is provided with a network address of the node, that will proxy access to the content or interaction be sought by the client.

Alternatively, in some embodiments, the network request to accesses a domain name associated to the server, is provided by a DNS system, and based on the determining, the client is provided with a network address of the node with proxy access to the domain name.

In some embodiments initial filtering criteria is provided by a DNS system.

In some embodiments, in initial filtering criteria, is provided by a content access validation delivery system.

The present invention also provides a computer program product as provided in claim 10.

Further particular and preferred aspects of the present invention are set out in the accompanying independent and dependent claims. Features of the dependent claims may be combined with the features of the independent claims as appropriate, and in combination other than those explicitly set out in the claims.

The present invention will now be more particularly described, by way of example only, with reference to the accompanying drawings, in which:

DETAILED DESCRIPTION

DDoS attacks can be single layered or multi-layered. In particular, DDoS attacks may be restricted to the Domain Name System (DNS) or alternate between DNS and Hypertext Transfer Protocol (HTTP) for secure communication (HTTPS). The architecture of an HTTPS service places a backend server containing the information that is being securely accessed in a single or at best, a few locations. All user requests are routed to the location of the backend server and managed there. In this scenario, the defence against DDoS attack comes down to being able to detect the IP addresses of the service abusers and block them on a firewall, if the server bandwidth has not already been flooded, or alternatively in the service provider infrastructure. In the case of a HTTPS DDoS attack, a bottleneck arises from resource starvation of the backend server because the cryptography of SSUTLS requires significantly more CPU cycles per request than the actual HTTP request.

The methods and systems described herein route an HTTP traffic request that is unencrypted or has been encrypted or transported through an encrypted tunnel from the client to a filtering Node. The filtering node is configured to pass the request to the protected backend server or drop the request based on one or more filtering criteria which determine whether the request is a bad request without decrypting the cryptography of the SSUTLS. In case of a detected bad request, the associated IP packets are dropped and the bandwidth of the filtering node is only used to handle suspicious traffic from the IP address.

The methods and systems described herein are designed to transparently pass the good traffic to the protected backend server. In the present context, "transparently" passing traffic implies that a secure socket layer (SSL) tunnel is created end-to-end, between an end user's device which may (or may not) involve a browser application and the content provider service. The methods and systems described herein do not decrypt, terminate or interfere with the cryptographic channel. Providers of confidential content can be sure that their traffic will not be compromised.

The methods and systems described herein provide an HTTPS mitigation system that acts as an inline proxy i.e. an intermediary server, that will block or pass the HTTPS request to the backend server.

Figure 1:
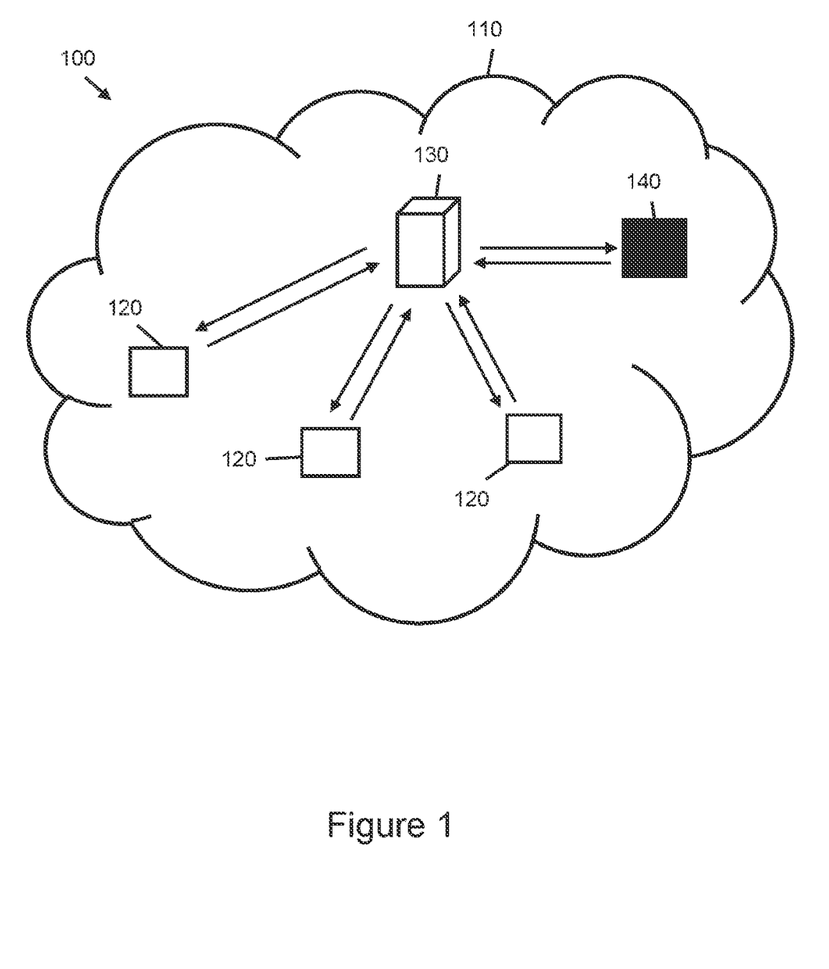
FIG. 1 is block diagram of an HTTPS service according to an example.

Referring first to FIG. 1, there is shown a standard HTTPS service 100 according to an example. The HTTPS service 100 is executed in a networked environment 110. The networked environment 110 shown in FIG. 1, may be for example the internet or a private network. In FIG. 1, one or more browser services 120, connect to a backend service 130. The clients 120 are arranged to connect to the backend service 130 using the SSL or TLS protocols. According to an example, an initial HTTPS request is sent to the backend service requesting that a secure connection is established between the backend service and the client. Further HTTP requests are then sent to the backend service across the secure connection.

FIG. 1 further shows a service 140. Service 140 in FIG. 1 is acting maliciously to prevent the backend service from serving the HTTP requests of the clients 120. In particular, the infected service 140 is carrying out a distributed denial of service attack against the backend service 130. In examples, the infected service 140 may comprise a plurality of individual infected nodes acting jointly as a botnet to carry out a DDoS. In some cases, the infected nodes are controlled by an agent acting as a centralised command and control centre for the botnet.

The methods and systems described herein focus on the HTTPS layer only. However, in certain examples, before an HTTPS communication, a client such as clients 120 shown in FIG. 1 may use a DNS service to lookup the IP address associated to an HTTP request. DNS services typically use a connectionless User Datagram Protocol (UTP) datagrams which may easily be spoofed. Thus, these are often a target of botnets in DDoS attacks. The protected website is as secure as the weakest link and the strategy of protecting HTTPS services has to include a protection of the DNS system.

The HTTPS mitigation system and methods described herein act as an inline proxy that will block or pass the HTTPS request to the backend server. The DNS system or cloud must present the IP address of the proxy as the address of protected backend server. The clients are arranged to connect to a filtering node. In, for example, an SSL session, the client expects to receive the SSL certificate of the web service. Since the filtering node is only a proxy it does not have a copy of the private key of the protected HTTPS service whose connection is forwarded to the backend server. This allows for the creation of an end-to-end encrypted channel between the client and the content being accessed on the backend server where there is no visibility of the transmitted content.

During communication all the traffic is monitored and the filtering algorithm executed at the filtering node executes filtering criteria. If the traffic or the traffic-rate is suspicious, an alarm for that IP address is raised. The system is tuned to not to raise an alert for the typical browsing that will be executed through a client. In examples, an alert is raised in response to bot-generated traffic. In certain examples described herein, the suspicious traffic may be redirected to a verification service. The verification service may perform one or more tests on the source of the traffic to determine if the traffic is human generated and or the user is authorised to access the destination server. For example, in one case, CAPTCHA tests are utilized to make the distinction. In another case the user's access credentials are exchanged and verified against an approved listing. Successfully solved puzzles will temporarily increase the metrics used to detect suspicious behaviour for that IP address. Unsuccessful attempts to solve CAPTCHA test or not solving it will classify the IP address as an attack and lead to the IP address being at least temporarily blocked. Additional protection of the HTTP layer can be provided by the Web Application Firewall (WAF). The WAF handles unencrypted HTTP requests and protects against HTTP related attacks.

According to examples described herein, HTTPS mitigation service is run in one of three available operating modes to match different needs of the end user.

Figure 2:
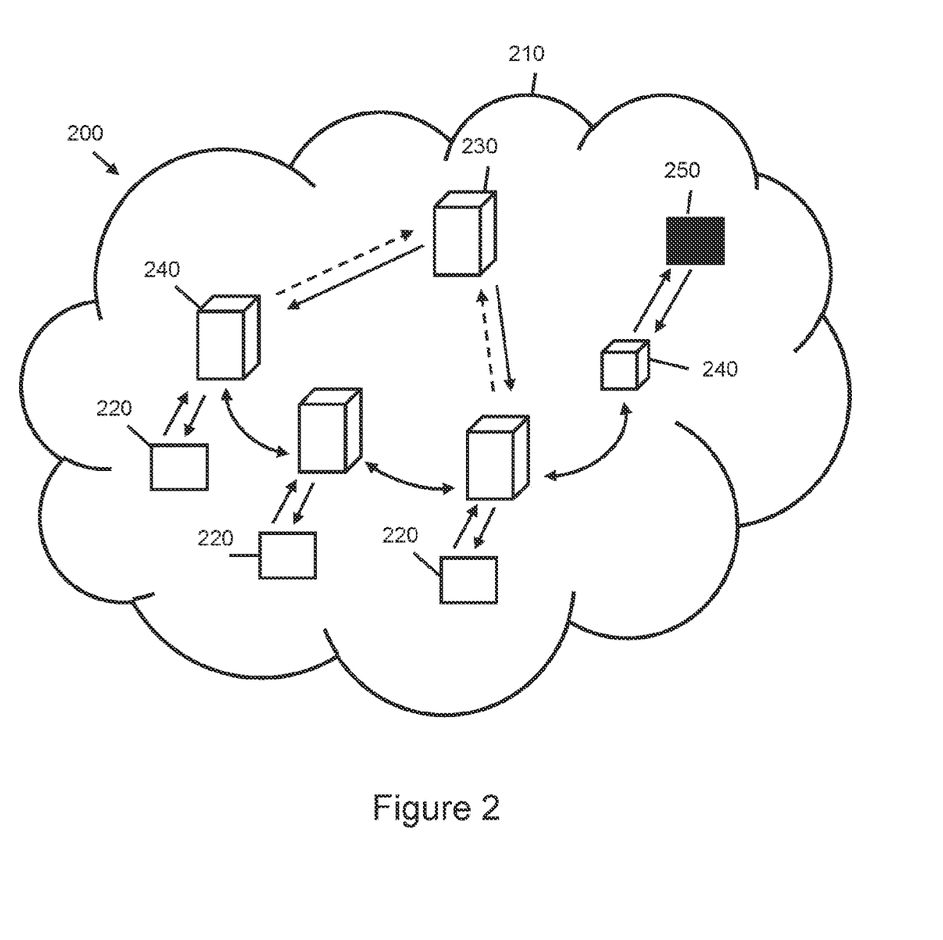
FIG. 2 is block diagram of an HTTPS service not forming part of the present invention.

Referring to FIG. 2 (not forming part of the present invention), there is shown a HTTPS mitigation service 200. The HTTPS mitigation service 200 may be executed in a networked environment 210, similarly to the networked environment 110 shown in FIG. 1 for example. In FIG. 2, one or more browser services 220, connect to a backend service 230.

In contrast to the clients 120 shown in FIG. 1, the clients 220 shown in FIG. 2 may connect to the backend service using the filter nodes 240 which act as a pass-through proxy for the SSL tunnel through which the content is delivered to the client's web client without necessitating the node hosting or decrypting the content or hosting the keys for the SSUTLS. The IP address of the backend service 230 is kept masked behind the filtering nodes. Thus, in particular, in the case where an infected service such as infected service 250, which may be maliciously to compromise the backend service 230 from delivering content to the client services in a DDoS attack, may be prevented by the filtering node detecting suspicious activity and disallowing the forwarding of packets from the infected service 250 to the backend service 230.

Figure 3:
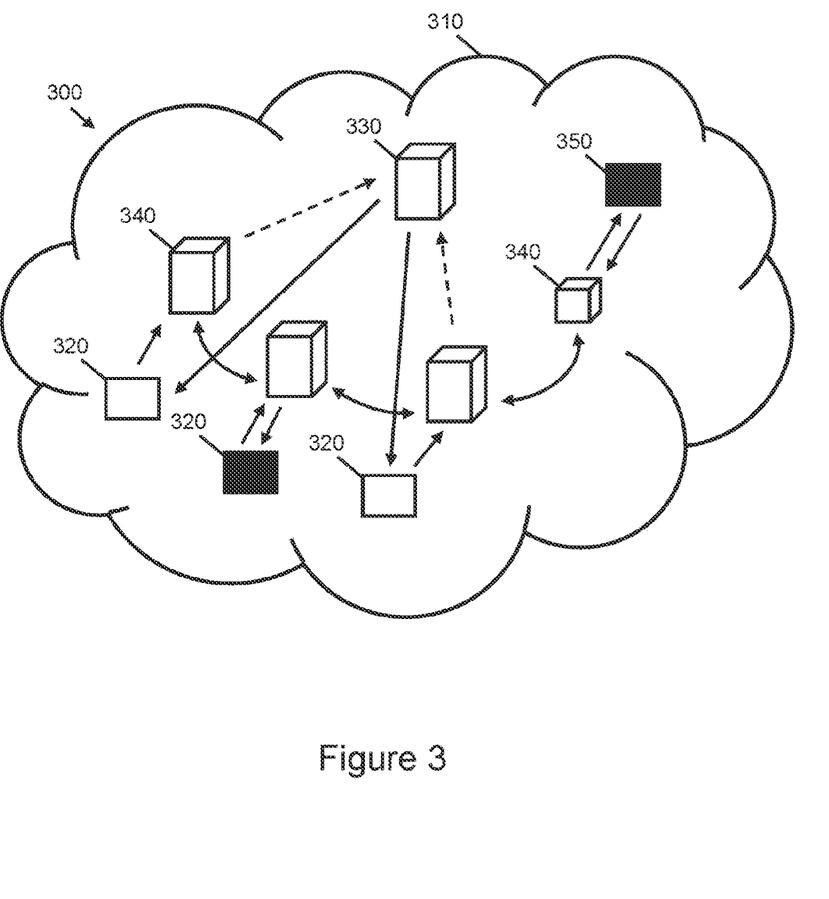
FIG. 3 is block diagram of an HTTPS service according to an example.

Referring to FIG. 3, there is shown a HTTPS mitigation service 300 according to examples described herein. The HTTPS mitigation service 300 is executed in a networked environment 310, similarly to the HTTPS mitigation service 200 shown in FIG. 2. As in FIG. 2, one or more browser services 320, connect to a backend service 330. Similarly, to the HTTPS mitigation service 200, the client 320 shown in FIG. 3 connect to the backend service 330 using the filter nodes 340 which act as a pass-through proxy for the SSL tunnel. FIG. 3 also shows an infected client session 350 attempting to implement a DDoS attack against the backend service 330.

A major difference of implementation in the service 300, is that the filter nodes 340 do not act as in-line proxies for the clients 320 to connect to the backend service 330. Once the filter nodes 340 evaluate the validity of the HTTP request a good request is redirected to the backend server 330 where the IP address of the client 320 is advertised to the backend server 330. An SSL response directly from the backend server 330 is made to the client 320, so the traffic flow is via the shortest possible path to the client 320. The filtering rules should allow sending the traffic on behalf of filtering nodes 340.

Figure 4:
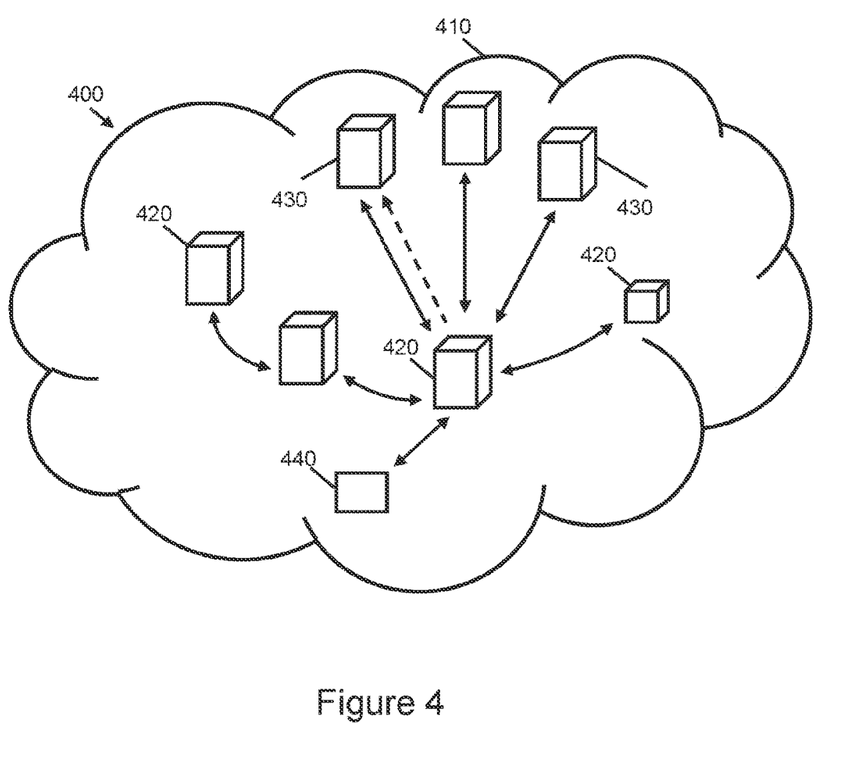
FIG. 4 is block diagram of an HTTPS service according to an example.

Referring to FIG. 4, there is shown a HTTPS mitigation service 400 according to examples described herein. The HTTPS mitigation service 400 is executed in a networked environment 410, similarly to the HTTPS mitigation services 200-300 shown in FIGS. 2-3. As in FIG. 2-3, one or more browser services 420, connect to a backend service 430.

A feature of the HTTPS mitigation services 200, 300 shown in FIGS. 2 and 3 is the ability to optimize which backend service server or cloud receives the SSL HTTPS request. According to methods and systems described herein there is an optimization algorithm along with the health/performance feeds from the servers/clouds. The filter nodes 420 shown in FIG. 4 can load balance based upon best path and best performance of the backend servers 430 that make up a backend service.

According to examples, the methods and systems described herein may utilize a remote authentication server.

A feature of the methods and systems described herein is to utilize a Remote Authentication Server, on the systems 200, 300 shown in FIGS. 2 and 3 one or more remote authentication systems on the front end of the HTTPS filter node 220, 320 may be implemented. The authentication system is the first filter point to identify whether the request is authorized to use the system and separate good requests and malicious requests.

Figure 5:
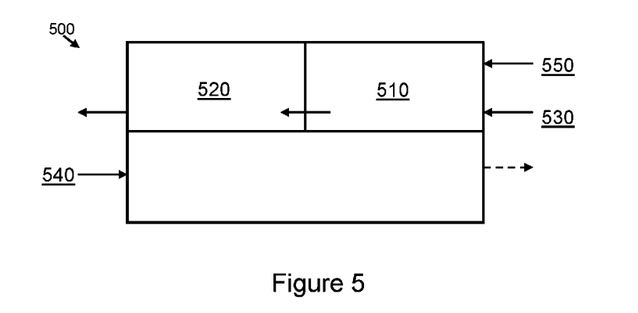
FIG. 5 is block diagram of a filter node not forming part of the present invention.

FIG. 5 (not forming part of the present invention) shows a schematic diagram 500 of an HTTPS filter node 500 comprising an authentication system 510 and HTTPS filter 520. The authentication system 510 is the first point where a SSUTLS request 530 enters the filter node 500, and the response 540 from the backend server may be routed through the filter node 500 used as a proxy. A bad request 550 need not be passed through the authentication and filter systems.

Figure 6:
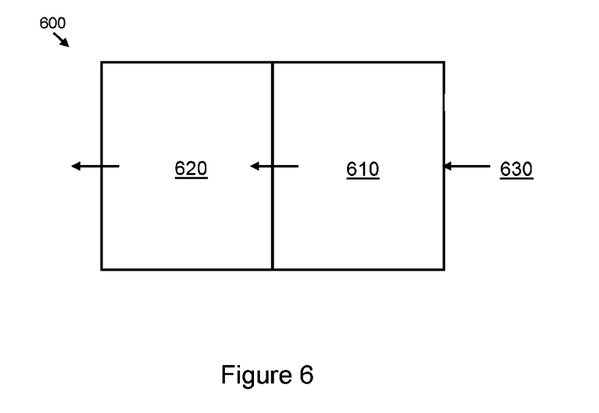
FIG. 6 is block diagram of a filter node according to an example.

FIG. 6 outlines the HTTPS filter node 600 such as the filter nodes 300 shown in FIG. 3, comprising a filter 620 and authentication system 610. The authentication system is the first point where the SSUTLS request 630 enters the filter system, and the response from the backend server is routed directly to the client (not shown in FIG. 6).

Figure 7:
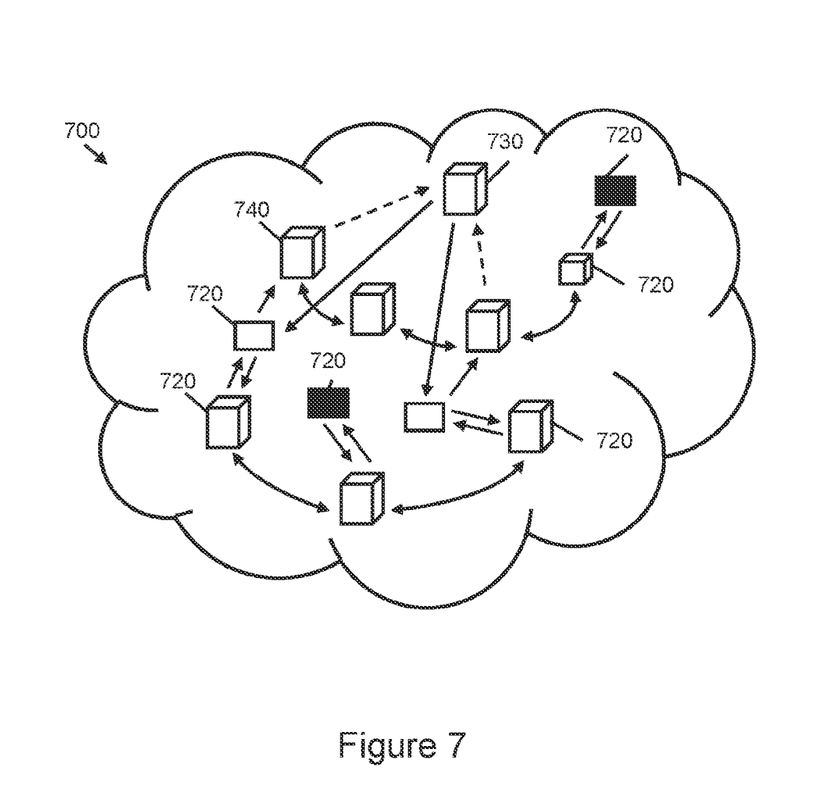
FIG. 7 is block diagram of an HTTPS service according to an example.

FIG. 7 depicts the integration of an HTTPS system 700 with a DNS system in an architecture with DDoS protection according to an example. In this scenario; a client (browser) 710 would like to access a website, for example, "Mypay.com". If the client 710 did not have the IP address, it would send a DNS request for "Mypay.com" to the closest DNS server 720. The address is filtered as good or bad. If the request is good, the address of the HTTPS cloud is given to the client. The client 710 request will be routed to nearest HTTPS filter node 740, that will determine if the request is good or bad, if good, it will forward the request to the backend, if malicious, the request will be dropped, as described previously. Subsequently, the client will access the backend services of 'mypay' through the HTTPS Cloud.

Figure 8:
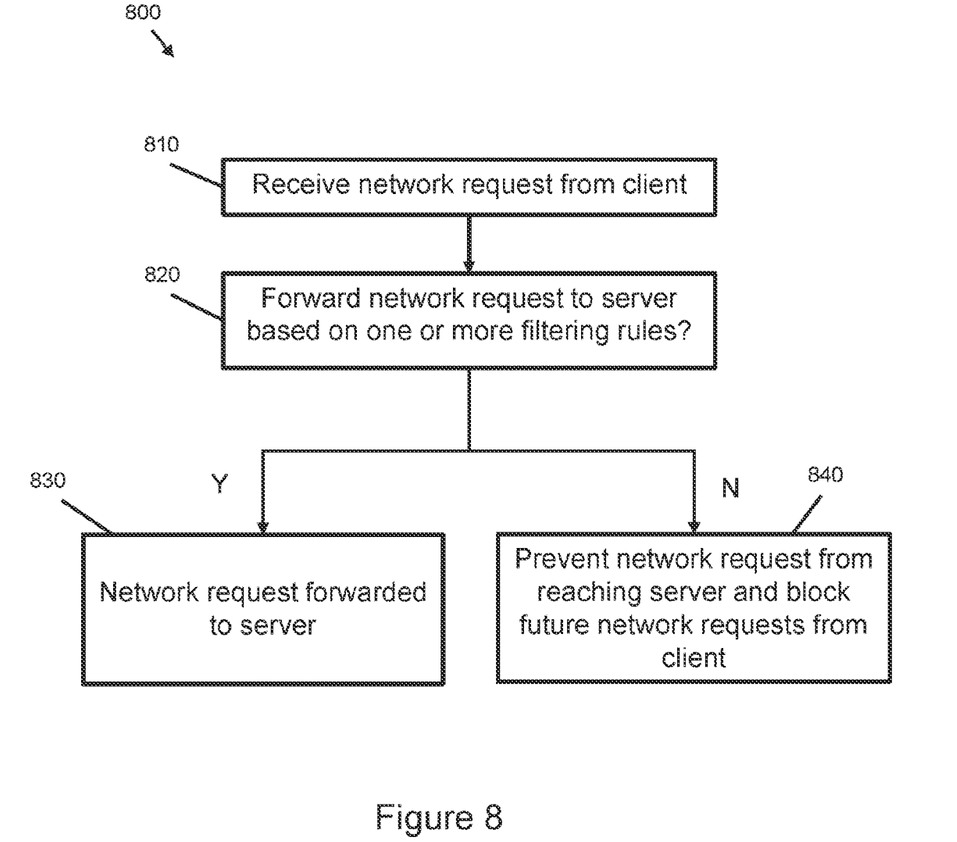
FIG. 8 is a diagram showing a flow chart for filtering data according to an example.

FIG. 8 is a flow diagram showing a method 800 of data filtering according to an example. The method 800 may be implemented in conjunction with the systems described herein. At block 810 a network request is received from a client. According to an example, the clients depicted in FIGS. 1-7 are clients. At block 820 it is determined, based on one or more filtering criteria, whether to forward the network request to a server. At blocks 830 and 840, based on the determining, either the network request is forwarded to the server or the network request is prevented from reaching the server future network requests from the client are blocked. According to examples the method is implemented at a filtering node such as those described herein in relation to FIGS. 1-7.

Although illustrative embodiments of the invention have been disclosed in detail herein, with reference to the accompanying drawings, it is understood that the scope of protection is defined by the appended claims and includes equivalents which are allowable under the doctrine of equivalents.

The invention claimed is:

1. A method for filtering data, comprising:
receiving a network request from a client at an HTTPS filter node, wherein the network request from the client is routed to the nearest HTTPS filter node;
determining, at the HTTPS filter node, and based on one or more filtering criteria, whether to forward the network request to a backend server; and
based on the determining, forwarding the network request from the HTTPS filter node to the backend server, or preventing the network request from reaching the backend server, and blocking future network requests from the client at the HTTPS filter node, wherein, in the event that the request is forwarded to the backend server from the HTTPS filter node, the method further comprising:
receiving a response directly from the backend server at the client, wherein the network request and response are either encrypted or unencrypted and wherein the said forwarding the network request is performed without decrypting the request in the case that the request is encrypted; and
wherein the response received at the client directly from the backend server is communicated directly from the backend server to the client, thereby bypassing the HTTPS filter node.

2. The method of claim 1, wherein the network request is a request to establish an end-to-end encryption channel with the backend server.

3. The method of claim 1, wherein the communication from the backend server is secured with one or more of: socket layer (SSL), transport layer security (TLS), symmetric encryption and asymmetric encryption.

4. The method of claim 1, wherein the filtering criteria comprise verification of CAPTCHA puzzles and metrics used to identify automated and/or non-human network traffic.

5. The method of claim 1, wherein an initial filtering criterion comprises identifying automated non-human network traffic.

6. The method of claim 1, wherein the initial filtering criteria comprise verification of credentials used to identify individuals authorised to access the network.

7. The method of claim 1, comprising determining the backend server from a plurality of backend servers to forward the network request to, based on performance metrics associated to the plurality of backend servers.

8. The method of claim 1, comprising:
authenticating the client; and
preventing the network request from reaching the backend server in response to a failed request verification.

9. The method of claim 1, wherein the network request is a request to access a domain name associated to the backend server.

10. A system for filtering data, comprising:
a backend server hardware;

an HTTPS filter node intermediary server hardware configured for:
receiving a network request from a client, wherein the network request from the client is routed to the nearest HTTPS filter node;
determining, at the HTTPS filter node, and based on one or more filtering criteria, whether to forward the network request to the backend server; and
based on the determining, forwarding the network request from the HTTPS filter node to the backend server, or preventing the network request from reaching the backend server, and blocking future network requests from the client at the HTTPS filter node, wherein, in the event that the request is forwarded to the backend server from the HTTPS filter node, further comprising:
receiving a response directly from the backend server at the client, wherein the network request and response are either encrypted or unencrypted and wherein the said forwarding the network request is performed without decrypting the request in the case that the request is encrypted; and
wherein the response received at the client directly from the backend server is communicated directly from the backend server to the client, thereby bypassing the HTTPS filter node.

11. The system of claim 10, wherein the network request is a request to establish an end-to-end encryption channel with the backend server.

12. The system of claim 10, wherein the communication from the backend server is secured with one or more of: socket layer (SSL), transport layer security (TLS), symmetric encryption and asymmetric encryption.

13. The system of claim 10, wherein the filtering criteria comprise verification of CAPTCHA puzzles and metrics used to identify automated non-human network traffic.

14. The system of claim 10, wherein an initial filtering criterion comprises identifying automated non-human network traffic.

15. The system of claim 10, wherein the initial filtering criteria comprise verification of credentials used to identify individuals authorised to access the network.

16. The system of claim 10, comprising determining the backend server from a plurality of backend servers to forward the network request to, based on performance metrics associated to the plurality of backend servers.

17. The system of claim 10, comprising:
authenticating the client; and
preventing the network request from reaching the backend server in response to a failed request verification.

18. The system of claim 10, wherein the network request is a request to access a domain name associated to the backend server.

* * * * *